UNITED STATES PATENT OFFICE.

WILLIAM H. YOUNG, OF BUFFALO, NEW YORK.

ARTIFICIAL STONE AND MARBLE.

SPECIFICATION forming part of Letters Patent No. 233,960, dated November 2, 1880.

Application filed September 30, 1880. (Specimens.)

*To all whom it may concern:*

Be it known that I, WILLIAM HENRY YOUNG, of the city of Buffalo, Erie county, and State of New York, have invented new and useful Improvements in Artificial Stone and Marble, of which the following is a specification.

The object of my invention is the production of a variety of artificial stones and imitation marbles which shall combine strength, hardness, and durability.

To this end I first prepare a mixture, (which I shall hereinafter term my "liquid compound,") with which I treat or mingle with the particular gross or body material required to produce the certain kind of stone or imitation marble desired to be made. The function of this compound is to chemically bind and solidify the particles of such body material (sand, gypsum, or whatever the same may be) together. It is prepared as follows: I take a quantity of lime-water made by dissolving twenty pounds of air-slaked lime in one hundred gallons of water. To this I add three pounds of litharge, five pounds of hemlock-bark, or its equivalent in tannic acid, three pounds of sulphur, and two pounds of zinc-white.

To make a simple artificial stone, I take about eight parts of sharp sand or gravel and one part of Portland or other like cement, and mix the same together intimately. I then take a portion of this mixture and tamp it into molds of any desired form in the usual way; then dampen it with my liquid compound, above described, and keep it thus well dampened for, say, two or three days, completing the process by keeping the mass wet with pure water for, say, two or three days longer. The molded block or other form becomes quite hard and compact, which hardness gradually increases with time.

Artificial stone made in this way is useful for building purposes, and is especially well adapted for sidewalks, monuments, drain-pipes, and a variety of purposes too numerous to detail.

To make artificial or imitation marbles, I take any white or light-colored cement or gypsum and wet the same with my liquid compound aforesaid until a pasty mass is formed. If I desire to have uniformity of color, I simply mix with the cement some suitable pigment, and variegated marbles can be readily made by skillful arrangements and combinations of different coloring materials in well-known ways.

For walls or stationary work I apply the plastic mass in the same manner—that is, with trowel—as ordinary cement is usually worked.

To make imitation fancy stone or marble tops for tables and for analogous uses, I take a plate of glass of the desired dimensions for a table-top, and by means of a whisk or brush dipped into vessels containing the above-described pasty stuff of different colors, spatter over one side of the glass a thin covering of the latter. I then make a backing of either gypsum, cement, or rice-flour mixture. The glass plate thus coated is now mounted in place on the table, and the imitation-marble surface appears through the glass beautifully, as if highly polished.

To produce a veined marble I cover the glass with a thin coating, on one side, of the said composition, white or colored, to correspond with the ground color of the marble intended to be imitated. While this coating is still soft I dip a camel's-hair brush in the composition differently colored from the ground coating, and, running the brush through the latter, trace the veins of color, imitating as nearly as may be those of the natural marble. This done the backing above mentioned is applied, and the article is ready to be mounted as soon as dry and hard.

For many purposes rice-flour, plain or colored, may be substituted for the cement or gypsum in producing my artificial marble.

I do not confine myself to the precise proportions of ingredients as herein mentioned, as these may be somewhat varied without injurious results.

Having thus described my invention, what I claim as new, and wish to secure by Letters Patent, is—

1. The compound of lime-water, litharge, tannic acid, sulphur, and zinc-white, substantially in the proportions specified, for the purpose of producing the coherence and solidification of artificial stone or marble, as described.

2. An artificial stone or marble composed of sand or cement, or their equivalents, treated with the said compound of lime-water, litharge, tannic acid, sulphur, and zinc-white, substantially as and in the manner described, whereby the mass is caused to unite and solidify.

3. The process of making fancy spotted or veined imitation-marble tops for tables and similar articles, which process consists in coating one side of a glass plate with a liquid or pasty composition in imitation of marble, and afterward suitably mounting the glass plate thus coated, substantially as set forth.

4. As a new and useful article of manufacture, a table-top made of plate-glass coated on one side thereof with an adhesive cement or composition, and made to imitate marble, substantially as specified.

WILLIAM HENRY YOUNG.

Witnesses:
 JAMES DEREGRE RELF,
 WILLIAM THOMAS.